United States Patent
Szczepanik et al.

(10) Patent No.: US 11,467,735 B2
(45) Date of Patent: Oct. 11, 2022

(54) I/O OPERATIONS IN LOG STRUCTURED ARRAYS

(71) Applicant: International Business Machines Corporation, Armonk, NY (US)

(72) Inventors: Grzegorz Piotr Szczepanik, Cracow (PL); Lukasz Jakub Palus, Cracow (PL); Kushal S. Patel, Pune (IN); Sarvesh S. Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 22 days.

(21) Appl. No.: 17/108,068

(22) Filed: Dec. 1, 2020

(65) Prior Publication Data

US 2022/0171537 A1    Jun. 2, 2022

(51) Int. Cl.
*G06F 3/06* (2006.01)

(52) U.S. Cl.
CPC ............ *G06F 3/0611* (2013.01); *G06F 3/065* (2013.01); *G06F 3/0659* (2013.01); *G06F 3/0665* (2013.01); *G06F 3/0673* (2013.01)

(58) Field of Classification Search
CPC ............ G06F 11/1458; G06F 11/1461; G06F 11/1464
See application file for complete search history.

(56) References Cited

U.S. PATENT DOCUMENTS

| | | | |
|---|---|---|---|
| 6,237,021 B1 | 5/2001 | Drummond | |
| 6,941,420 B2 | 9/2005 | Butterworth et al. | |
| 8,935,493 B1 | 1/2015 | Dolan et al. | |
| 10,146,631 B1 | 12/2018 | Pradeep et al. | |
| 10,303,550 B2 | 5/2019 | Kumarasamy et al. | |
| 10,514,986 B2 | 12/2019 | Bangalore et al. | |
| 2002/0073277 A1 | 6/2002 | Butterworth | |
| 2005/0071550 A1 | 3/2005 | Lowe et al. | |
| 2014/0136884 A1 | 5/2014 | Werner et al. | |
| 2017/0032005 A1 | 2/2017 | Zheng et al. | |
| 2017/0083250 A1* | 3/2017 | Beeken ................. G06F 3/0689 |

OTHER PUBLICATIONS

Mell et al., "The NIST Definition of Cloud Computing", Recommendations of the National Institute of Standards and Technology, Special Publication 800-145, Sep. 2011, 7 pages.
International Search Report and Written Opinion for Application No. GB2116550.1, dated Jul. 5, 2022, 10 pages.

* cited by examiner

*Primary Examiner* — Yong J Choe
(74) *Attorney, Agent, or Firm* — Timothy J. Singleton (57) ABSTRACT

A method, system, and computer program product for managing input/output (I/O) operations in log structured arrays (LSA) is provided. The method receives a write request for a storage volume. The write request including a set of data. The method determines the set of data for a target extent of the storage volume is not copied to a target location based on a target map for a flash copy volume. An LSA is instructed to perform an internal copy-on-write (COW) for the set of data during a next IO operation for the storage volume. Based on the internal COW instruction, the method moves an internal pointer of the target location from a virtual volume to the flash copy volume.

20 Claims, 6 Drawing Sheets

I/O OPERATIONS IN LOG STRUCTURED ARRAYS

BACKGROUND

Some computing storage systems enable point-in-time data copy features. These features may be available at a block storage level. For example, point-in-time data copy features may include creation of copies to create full volume copies of data in a given storage unit. The copy establishes a relationship between a source volume and a target volume. The established pair of volumes act as a point-in-time copy and allow read and write operations to both the source and target volumes. When a write occurs on the source volume, data may be copied to a target location and then new data may be written to the source volume.

SUMMARY

According to an embodiment described herein, a computer-implemented method for managing input/output (I/O) operations in log structured arrays (LSA) is provided. The method receives a write request for a storage volume. The write request including a set of data. The method determines the set of data for a target extent of the storage volume is not copied to a target location based on a target map for a flash copy volume. An LSA is instructed to perform an internal copy-on-write (COW) for the set of data during a next IO operation for the storage volume. Based on the internal COW instruction, the method moves an internal pointer of the target location from a virtual volume to the flash copy volume.

According to an embodiment described herein, a system for managing input/output (I/O) operations in log structured arrays (LSA) is provided. The system includes one or more processors and a computer-readable storage medium, coupled to the one or more processors, storing program instructions that, when executed by the one or more processors, cause the one or more processors to perform operations. The operations receive a write request for a storage volume. The write request including a set of data. The operations determine the set of data for a target extent of the storage volume is not copied to a target location based on a target map for a flash copy volume. An LSA is instructed to perform an internal copy-on-write (COW) for the set of data during a next IO operation for the storage volume. Based on the internal COW instruction, the operations move an internal pointer of the target location from a virtual volume to the flash copy volume.

According to an embodiment described herein, a computer program product for managing input/output (I/O) operations in log structured arrays (LSA) is provided. The computer program product includes a computer-readable storage medium having program instructions embodied therewith, the program instructions being executable by one or more processors to cause the one or more processors to receive a write request for a storage volume. The write request including a set of data. The computer program product determines the set of data for a target extent of the storage volume is not copied to a target location based on a target map for a flash copy volume. An LSA is instructed to perform an internal copy-on-write (COW) for the set of data during a next IO operation for the storage volume. Based on the internal COW instruction, the computer program product moves an internal pointer of the target location from a virtual volume to the flash copy volume.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

The present disclosure relates generally to methods for managing I/O operations in LSA environments. More particularly, but not exclusively, embodiments of the present disclosure relate to a computer-implemented method for managing I/O operations in LSA during block data backup in unified storage systems. The present disclosure relates further to a related system for managing I/O operations in LSA environments, and a computer program product for operating such a system.

Data storage systems and facilities are often built to perform processing challenges quickly and for a relatively large number of users. Some of these systems integrate database, processing, and storage into a single compact system. These systems may be configured for analytical processing and designed for flexible growth. As raw data is analyzed, business intelligence applications leveraging these data storage systems may issue many read input/output (I/O) operations to collect data for processing. These applications may also send many write I/O operations to save intermediate data in temporary storage spaces. These applications may leverage data storage system architectures having a plurality of hosts connected to a plurality of server blades, which are then connected to a plurality of disk enclosures. The multiple disks may be volumes which are exposed from the storage system or storage system architecture. Each disk may have multiple virtualized volumes. The virtualized volumes may be exposed to upper layers of the systems and be used to store data, at least temporarily. A storage control or storage controller cluster may enable virtualization of the storage disks. These storage control components may also enable storage level backups and snapshot, Flash Copy, or point-in-time data copies of virtualized volumes. These point-in-time data copies may be performed at a block level, and may be used for various purposes.

Where point-in-time copies are used in conjunction with log structured arrays, write operations performed on point-in-time data copies may result in holes due to internal movement of data creating invalid data locations. As holes increase, available storage may be decreased. Garbage collection operations are used to remove holes from the log structured arrays. Garbage collection operations may be computationally intensive and cause interruption to other operations.

Some data storage systems employ log structured array (LSA) file systems. LSA systems may address write performance issues of some data storage systems by buffering a sequence of file system changes. The changes may be buffered in a cache. Once a suitable number of changes, a time period, or other threshold condition is met, the changes may be written from the cache to a given disk sequentially. The sequential writing may be performed in a single disk write operation. The changes may be written to the disk may include file data blocks, attributes, index blocks, directories, or any other information which may be used to manage the file system.

Block storage systems may use a similar approach for log structured block storage. In such systems, logical blocks may be defined for a volume. The logical blocks may be pointed to the actual logical block address (LBA) of the disk. The logical volume LBA (e.g., LBA for a virtual volume of the disk) of the block storage systems may be managed as a log structured array to manage write operations for the storage system. Each host write operation may be saved at new logical LBA locations to which the data pointers are located. In such systems, write I/O operations and seek times for a physical LBA of the storage system may be eliminated for each write operation. For example, the block storage system may create a volume from a block storage pool. The volume may be exposed to a host application to perform I/O operations on the disk. The volume may have logical LBAs associated therewith that are internally pointed to physical LBA locations based on a mapping policy of a storage controller architecture for the block storage system. In this manner, the block storage system may have a log structured implementation at a storage pool level. Further, the block storage system may have one location as a pointer to a circular buffer location. Where a host issues a write I/O to a volume, the data may be written to the LSAs latest pointer location and the pointer may be moved to a next logical location.

As data is written in a circular buffer, in this manner, each time a pointer is moved to a next location, an invalid location is created in the LSA of the storage controller. The invalid data location may be a hole in the LSA. To be cleared from the buffer space, holes are subject to garbage collection operations. While the garbage collection process frees up a physical volume LBA in the LSA, the operations are computationally intensive and cause a pause in normal I/O operations. Garbage collection operations may be triggered when a threshold number of logical blocks are occupied in the LSA or a number of holes have increased beyond a specified threshold. During garbage collection operations, the logical and physical LBA addresses may be changed to make locations sequential in the logical LBA map. The LSA pointers may be updated so that the additional freed logical LBA locations may become useable by the LSA or the storage controller. As garbage collection operations are used or become more frequent, the impact of the garbage collection operations on the storage system increases.

Block storage systems may use point-in-time data copy features, such as flash copy, to create full volume copies of data within a storage unit. Flash copy creates a relationship between a source volume and a target volume. The flash copy operation also creates a bitmap of the source volume. Once the relationship and bitmap are created, the target volume may be accessed as though the data had been physically copied. Similarly, a background process may copy the tracks from the source to the target volume. The target or copy generated by the flash copy operation generates a point-in-time copy of the source volume, and both the source volume and target volume can be subject to read and write operations. In some instances, a target volume can be generated as a flash copy when new data is to be written to a source volume. In such instances, the data of the source volume at a time T may be copied to the target location as T0 data. The data to be written to the source volume may be written as T1 data. Writing the T1 data may update a bitmap for a selected I/O location. In this manner, an instant copy of the volume is created while actual data will be copied when writes are issued to the source disk. This operation may be understood as a copy-on-write (COW) operation.

In log structured arrays, storage-based snapshots may be configured in a storage virtualization using a COW operation. When a write I/O operation is sent to the storage system, a location of the logical volume level LBA is identified in a virtualization map. An existing flash copy relationship may be parsed and a data movement decision may be made by a virtualization engine or storage controller. When a write I/O operation is received by a source volume and a previous flash copy has not been established, the data is moved to the target disk. A host I/O operation may then be written to the source disk. In this instances, one internal I/O operation is generated from source volume to target volume movement that will increment an LSA pointer by one. The internal I/O operation also creates a hole in the LSA. When the operation is completed, a host write operation is saved at a latest LSA pointer location. This internal movement leads to a hole in the LSA. Where source disks are write oriented, a number of holes in the LSA increase and may trigger a garbage collection operation. Repeated garbage collection operations may lead to performance issues and delays to host applications while garbage collection operations are processed.

Embodiments of the present disclosure enable efficient handling of COW data and operations in LSA and similar implementations of storage systems. Some embodiments of the present disclosure enable a storage system to avoid holes or empty spaces within a log storage array or volumes of a storage system. The present disclosure may reduce or eliminate empty spaces within a log structured array by enabling data movement from write operations in a layered fashion. In some embodiments, the present disclosure enables differentiation between internal data movement and host application write operations. Some embodiments of the present disclosure enable a mechanism by which an LSA algorithm differentiates between COW movement and write I/O operations to increase performance and data management efficiency within a storage system. In some embodiments, the present disclosure presents methods and systems enabling operation of a log structured array and flash copy service modules in a storage management system. Embodiments of the present disclosure may provide information to a storage system related to flash copy COW operations and internal movements of data blocks at the time of COW operations. In some embodiments, the present disclosure enables communication between two models in a storage management system for in-bound and out-of-bound API implementation and enable command exchanges between functional modules of the storage system.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
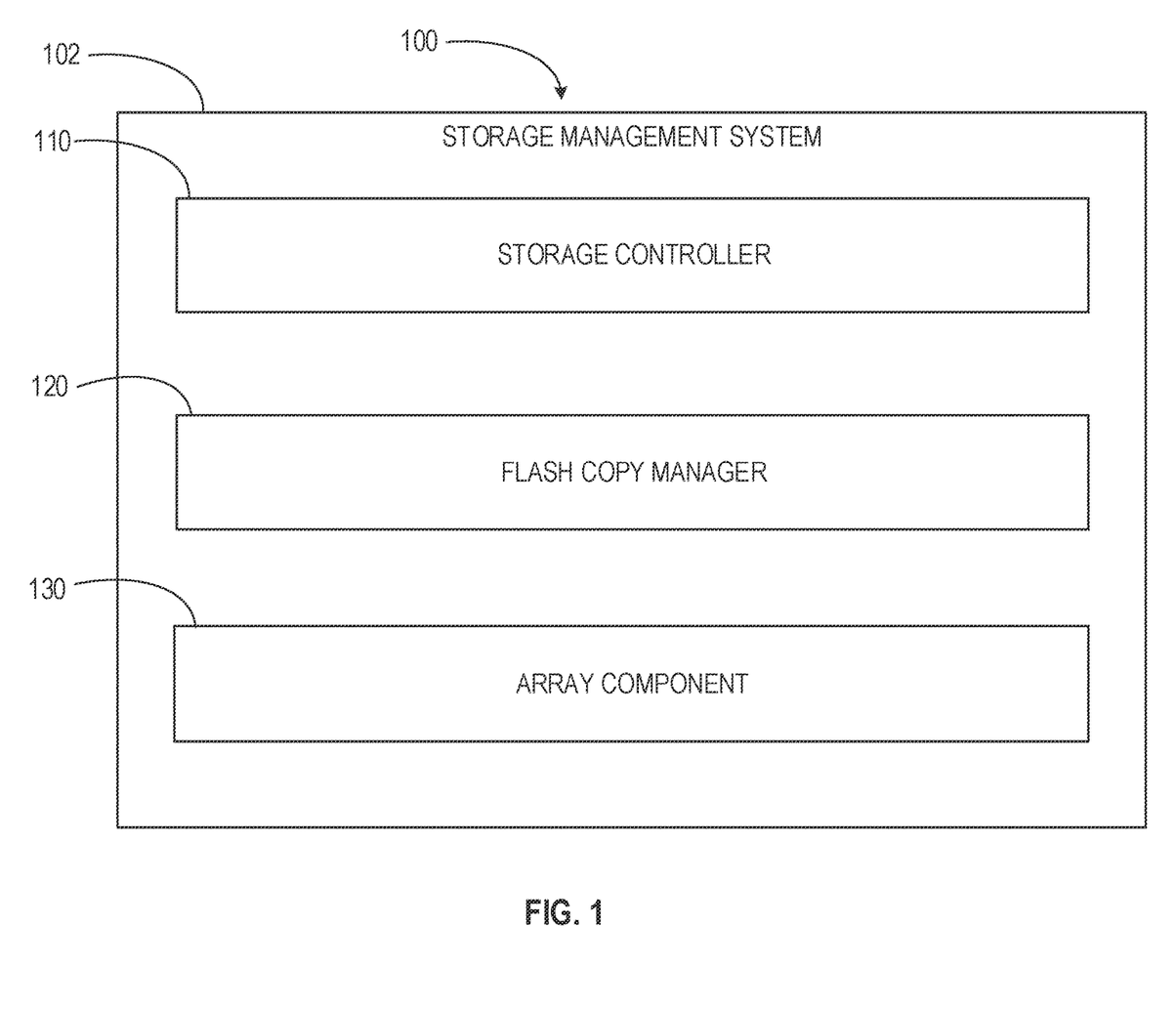
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a storage management system 102. The storage management system 102 may comprise a storage controller 110, a flash copy manager 120, and an array component 130. The storage controller 110 receives requests for one or more storage volumes and coordinates operations for disks associated with the storage management system 102. The flash copy manager 120 performs operations related to virtual storage volumes for disks associated with the storage management system 102. The array component 130 performs operations related to a log structured array of disks associated with the storage management system 102. Although described with distinct components, it should be understood that, in at least some embodiments, components may be combined or divided, and/or additional components may be added without departing from the scope of the present disclosure.

Figure 2:
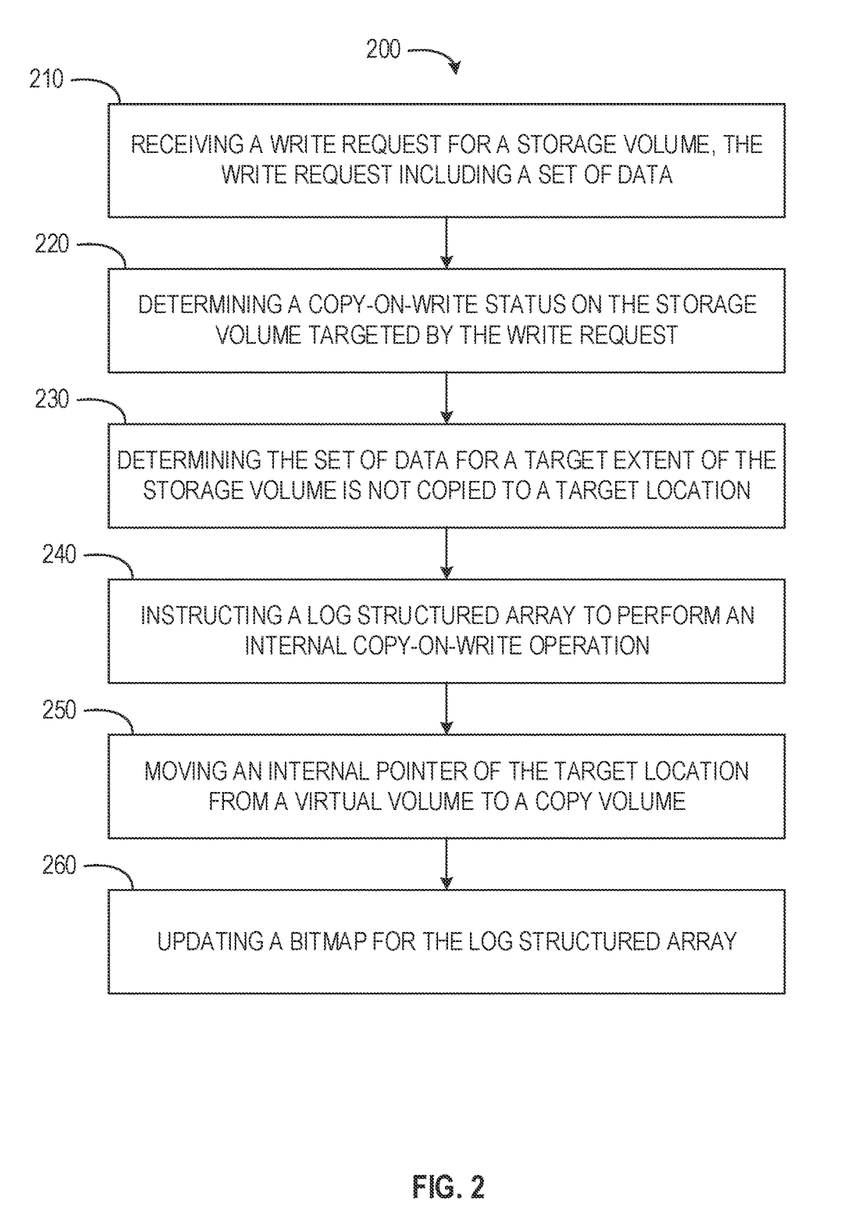
FIG. 2 depicts a flow diagram of a computer-implemented method for managing I/O operations in LSA environments, according to at least one embodiment.

Referring now to FIG. 2, a flow diagram of a computer-implemented method 200 is shown. The computer-implemented method 200 is a method for managing I/O operations in LSA environments. In some embodiments, the computer-implemented method 200 may be performed by one or more components of the computing environment 100, as described in more detail below.

At operation 210, the storage controller 110 receives a write request for a storage volume. In some embodiments, the write request includes a set of data. The storage volume may be an individual storage volume within a plurality of storage volumes accessible by or managed by the storage management system 102. The write request may be received from a host interacting with a set of disks or a storage system coupled to the storage management system 102. In some embodiments, the host may be a computing device operated by a user and interacting with a storage system or set of disks remote from the host. For example, the host may transmit a write request to the storage controller 110 via a communications network. The storage controller 110 may receive the write request to process and implement the write request on a volume within a cloud-based storage system.

At operation 220, the flash copy manager 120 determines a copy-on-write (COW) status on the storage volume targeted by the write request. In some embodiments, the flash copy manager 120 determines the COW status by identifying the storage volume has COW functionality enabled within the storage system. The flash copy manager may determine the COW status for the storage volume based on one or more configuration files for the storage volume, a disk housing the storage volume, or the storage system of which the storage volume or disk are a part.

At operation 230, the flash copy manager 120 determines the set of data for the target extent of the storage volume is not copied to a target location. The flash copy manager 120 may determine the set of data is not copied based on a target map for a flash copy volume. The target map may indicate data stored within specified data locations for a target volume. In some instances, the target map represents data within a flash copy of a volume (e.g., a source volume) at a given time. For example, the target volume may be a target volume at T0.

In some embodiments, the flash copy manager 120 communicates with the array component 130 using an out-of-band protocol. The flash copy manager 120 may communicate with the array component 130 using reserved fields in a write command descriptor block (CBD), such as a small computer system interface (SCSI) CBD. The SCSI CBD may be a block of information describing a command. Each CBD may be a total of 6, 10, 12, or 16 bytes, or any suitable variable length. In some instances, the flash copy manager 120 and the array component 130 communicate using both the out-of-band protocol and reserved fields in the CBD as layers within the storage management system 102. The flash copy manager 120 and the array component 130 pass information across layers or user any other suitable independent mechanism. In some embodiments, a heat map may be communicated from one storage system to another. The heat map may be communicated to ensure that remote copies, which may fail over access to remote sites, maintain specified data within a given storage volume, disk, or SSD.

At operation 240, the array component 130 instructs a log structured array (LSA) to perform an internal COW operation. The internal COW operation may be performed for the set of data during a next input/output (I/O) operation for the storage volume. In some embodiments, the flash copy manager 120 transmits instructions to a storage pool configured as a LSA. The instructions indicate that a next I/O operation will be an internal COW operation. The internal COW operation may write the set of data of the write request to a virtual volume (e.g., a source volume). The internal COW operation may also generate a copy of the virtual volume, prior to writing the set of data, as a flash copy volume (e.g., a target volume). The instructions may indicate that the internal COW operation is to be followed by an actual application host write I/O operation.

At operation 250, the storage controller 110 moves an internal pointer of the target location from a virtual volume to the flash copy volume. In some embodiments, the internal pointer is moved based on the internal COW instruction. In such instances, the internal COW instruction is treated as a signal to a hole preventing apparatus within the storage controller 110 to move the internal pointer. In embodiments where the set of data is written to the source volume and a target volume is generated as a flash copy, the internal pointer of the target location is moved from a location in the source volume to a location in the target volume. Moving the internal pointer of the target location to the target volume or flash copy volume prevents a hole from occurring within the LSA due to the set of data of the write request being written to the virtual volume or source volume. Once the flash copy volume is established and the internal pointer is moved, the older version of the data in the LSA, associated with the write request, will be associated with a pointer directed to the flash copy volume indicating the older source logical LBA.

At operation 260, the array component 130 updates a bitmap for the LSA. In some embodiments, the bitmap is updated in response to the change of the internal pointer. Where the internal pointer is moved, the bitmap for the LSA may be updated by the array component 130 and an instruction sent to the flash copy manager 120 to make volume copies consistent among flash copied volumes. Upon completion of the bitmap update and the volume copies being made consistent, a host application may be treated normally and increment an LSA pointer and save data to a next location in a circular buffer. In such instances, a new pointer for the set of data of the write request may link the virtual volume or source volume with the set of data in a new location in the LSA.

As the internal pointer is moved and the new pointer is generated in a case of COW operation, the actual data copy to a physical disk is not required. Generating a flash copy, using COW, and moving pointers reduces I/O movement to physical locations. The reduction in I/O movement may reduce computing time and resources required to functionally carry out the write request. Limiting I/O movement may increase performance of an associated storage system. Further, use of COW and moving of pointers minimizes holes within the log structured array, thus reducing frequency of garbage collection operations at the LSA. Decreased frequency of garbage collection operations may also increase health and lifespan of SSD disks.

Figure 3:
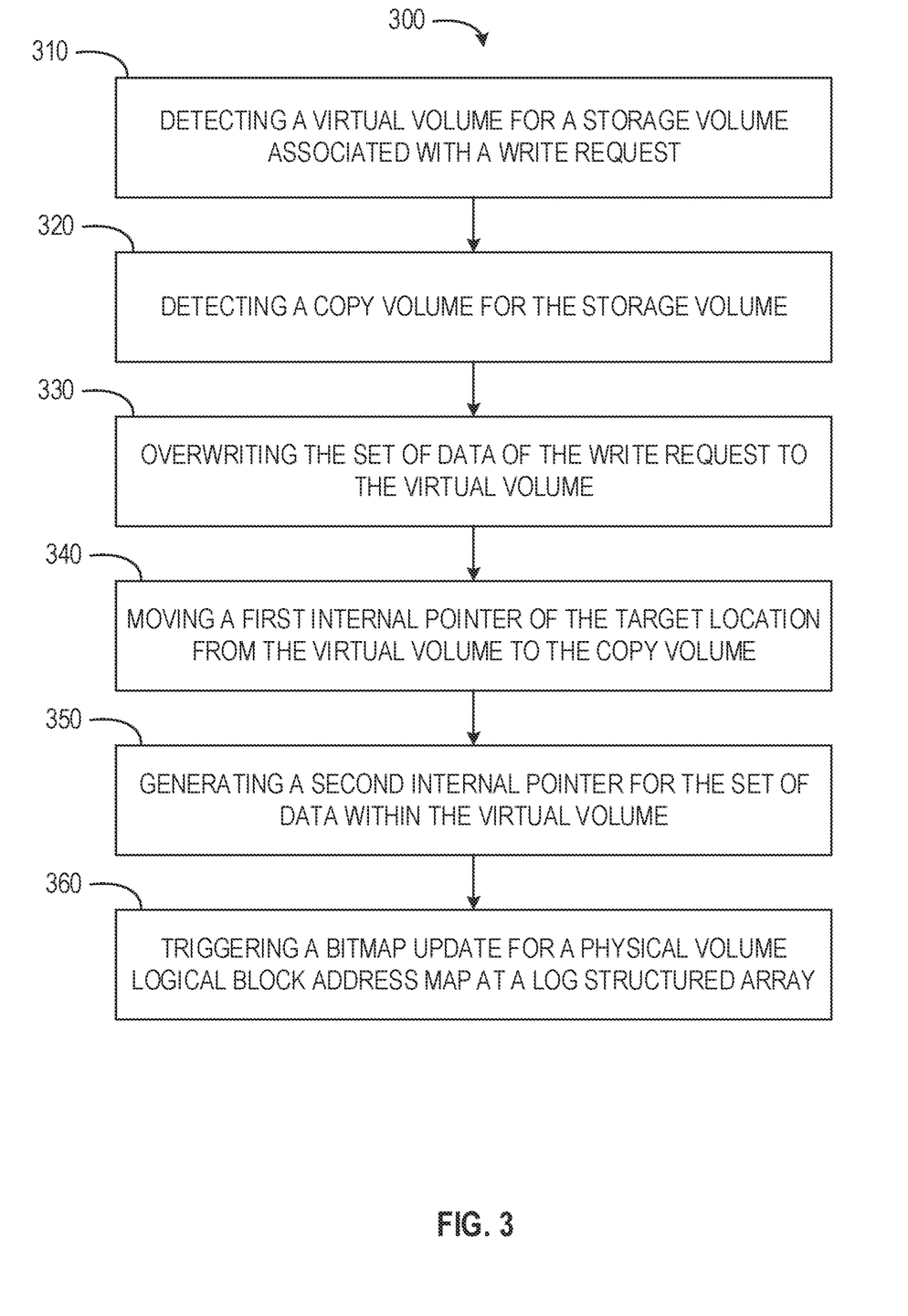
FIG. 3 depicts a flow diagram of a computer-implemented method for managing I/O operations in LSA environments, according to at least one embodiment.

FIG. 3 shows a flow diagram of an embodiment of a computer-implemented method 300 for managing I/O operations in LSA environments. The method 300 may be performed by or within the computing environment 100. In some embodiments, the method 300 comprises or incorporates one or more operations of the method 200.

In operation 310, the storage controller 110 detects a virtual volume for a storage volume associated with a write request. The virtual volume may be detected in response to the storage controller 110 receiving a write request containing a set of data to be written on the storage volume. In some embodiments, the storage controller 110 cooperates with the flash copy manager 120 to detect the virtual volume. The virtual volume may be a buffer or cache for a physical volume for data storage (e.g., the storage volume).

In operation 320, the storage controller 110 detects a flash copy volume for the storage volume. The flash copy may be a copy at a given point in time for the virtual storage volume. In some embodiments, the flash copy volume is a previously generated copy of the virtual volume. The flash copy volume may contain a complete copy of the data within the virtual volume at a specified time. The specified time may be any time prior to receipt of the write request. Where no flash copy volume is detected, the flash copy manager 120 may be instructed to generate a flash copy of the virtual volume at a time the virtual volume is detected by the storage controller 110 or a time of receiving the write request. In some instances, the flash copy volume is detected or generated in response to one or more of operations 220 and 230.

In operation 330, the array component 130 overwrites the set of data to the virtual volume. In some embodiments, the set of data replaces a set of prior values within the virtual volume. In some instances, the array component 130 overwrites the set of data within the virtual volume by inserting the set of data into a logical LBA map for the virtual volume.

In operation 340, the storage controller 110 moves a first internal pointer of the target location from the virtual volume to the flash copy volume. In some embodiments, the first internal pointer is moved based on the internal COW instruction. The first internal pointer may be moved in a manner similar to or the same as described in reference to operation 250.

In operation 350, the storage controller 110 generates a second internal pointer for the set of data within the virtual volume. In some embodiments, the second internal pointer is generated to point from the set of data within the virtual volume to a location in a physical volume logical block address (LBA) map for the storage volume.

In operation 360, the storage controller 110 triggers a bitmap update for the physical volume LBA map at the LSA. In some embodiments, the bitmap update is triggered based on moving the first internal pointer and generating the second internal pointer.

Figure 4:
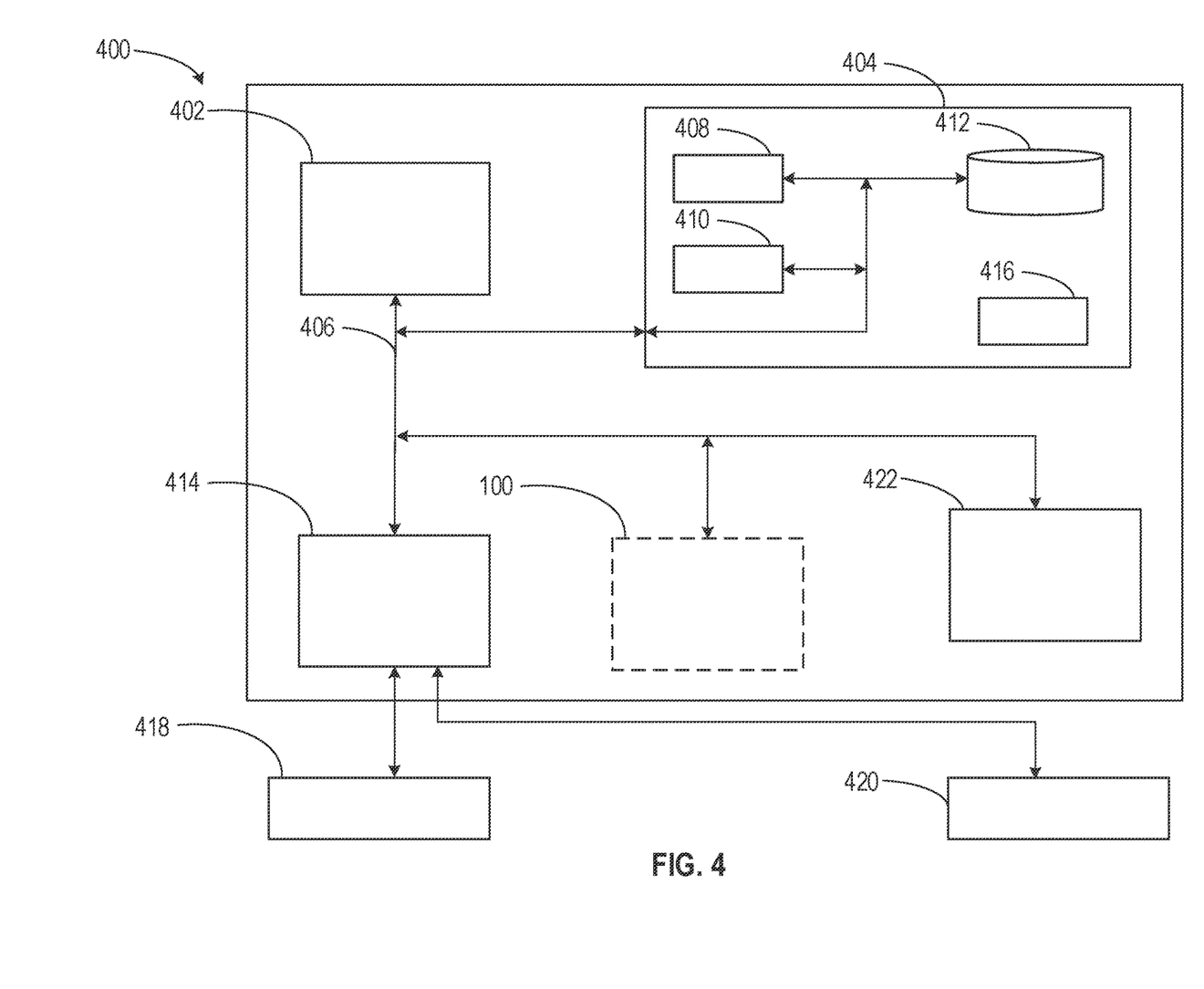
FIG. 4 depicts a block diagram of a computing system for managing I/O operations in LSA environments, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for managing I/O operations in LSA environments.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the storage controller 110, the flash copy manager 120, and the array component 130, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
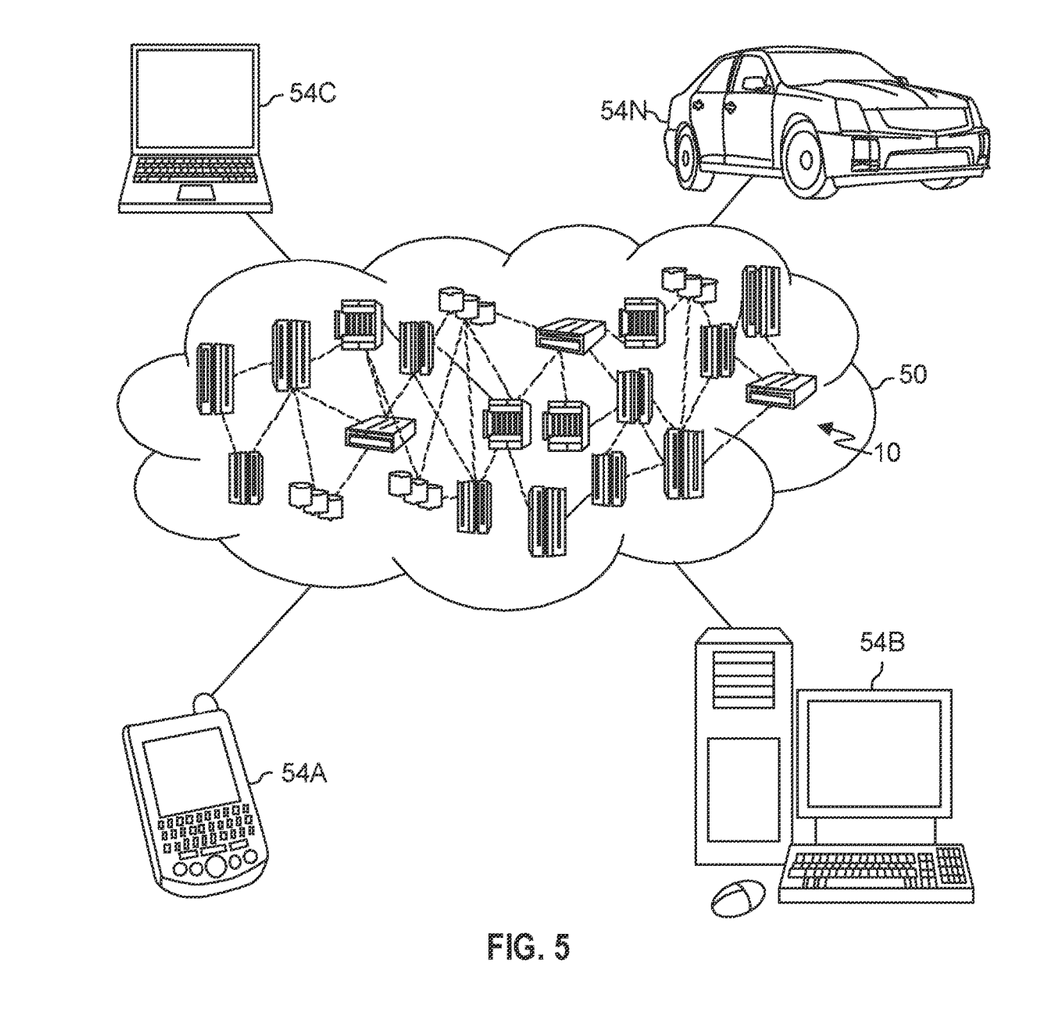
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
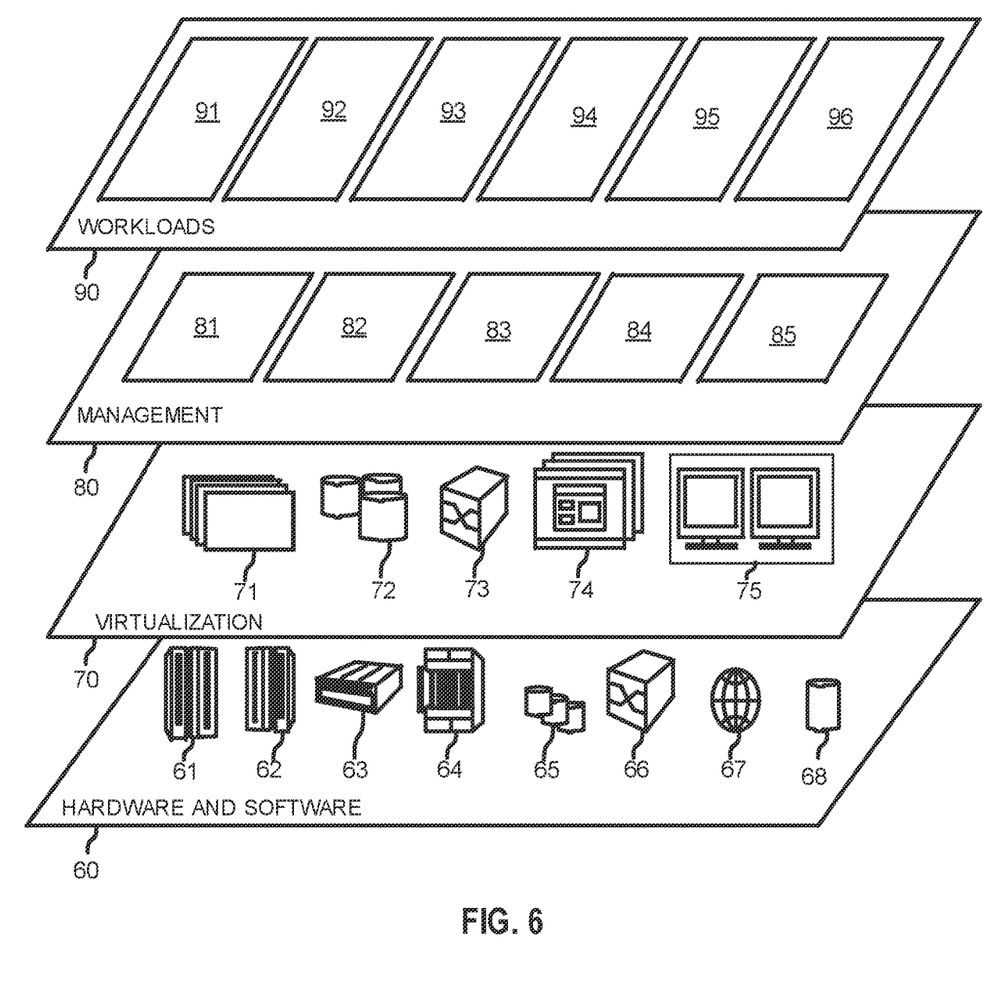
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage management processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a storage controller, a write request for a storage volume, the write request including a set of data;
   determining the set of data for a target extent of the storage volume is not copied to a target location based on a target map for a flash copy volume;
   instructing a log structured array (LSA) to perform an internal copy-on-write (COW) for the set of data during a next input/output (I/O) operation for the storage volume;
   based on the internal COW instruction, moving a first internal pointer of the target location from a virtual volume to the flash copy volume; and
   generating a second internal pointer for the set of data from the virtual volume to a bitmap for the storage volume.

2. The method of claim 1, further comprising:
   in response to the moving of the internal pointer, updating a bitmap for the LSA.

3. The method of claim 1, further comprising:
   determining a COW status on the storage volume targeted by the write request.

4. The method of claim 1, further comprising:
   detecting the virtual volume for the storage volume; and
   detecting the flash copy volume for the storage volume.

5. The method of claim 4, further comprising:
   overwriting the set of data to the virtual volume, the set of data replacing a set of prior values within the virtual volume.

6. The method of claim 5, the method further comprising:
   generating the second internal pointer for the set of data within the virtual volume to a location in a physical volume logical block address (LBA) map for the storage volume.

7. The method of claim 6, further comprising:
   based on moving the first internal pointer and generating the second internal pointer, triggering a bitmap update for the physical volume LBA map at the LSA.

8. A system, comprising:
   one or more processors; and
   a computer-readable storage medium, coupled to the one or more processors, storing program instructions that, when executed by the one or more processors, cause the one or more processors to perform operations comprising:
   receiving, by a storage controller, a write request for a storage volume, the write request including a set of data;
   determining the set of data for a target extent of the storage volume is not copied to a target location based on a target map for a flash copy volume;
   instructing a log structured array (LSA) to perform an internal copy-on-write (COW) for the set of data during a next input/output (I/O) operation for the storage volume;
   based on the internal COW instruction, moving a first internal pointer of the target location from a virtual volume to the flash copy volume; and
   generating a second internal pointer for the set of data from the virtual volume to a bitmap for the storage volume.

9. The system of claim 8, wherein the operations further comprise:
   in response to the moving of the internal pointer, updating a bitmap for the LSA.

10. The system of claim 8, wherein the operations further comprise:
    determining a COW status on the storage volume targeted by the write request.

11. The system of claim 8, wherein the operations further comprise:
    detecting the virtual volume for the storage volume; and
    detecting the flash copy volume for the storage volume.

12. The system of claim 11, wherein the operations further comprise:
    overwriting the set of data to the virtual volume, the set of data replacing a set of prior values within the virtual volume.

13. The system of claim 12, the operations further comprising:
    generating the second internal pointer for the set of data within the virtual volume to a location in a physical volume logical block address (LBA) map for the storage volume.

14. The system of claim 13, wherein the operations further comprise:
    based on moving the first internal pointer and generating the second internal pointer, triggering a bitmap update for the physical volume LBA map at the LSA.

15. A computer program product comprising a computer readable storage medium having program instructions embodied therewith, the program instructions being executable by one or more processors to cause the one or more processors to perform operations comprising:
    receiving, by a storage controller, a write request for a storage volume, the write request including a set of data;
    determining the set of data for a target extent of the storage volume is not copied to a target location based on a target map for a flash copy volume;
    instructing a log structured array (LSA) to perform an internal copy-on-write (COW) for the set of data during a next input/output (I/O) operation for the storage volume;
    based on the internal COW instruction, moving a first internal pointer of the target location from a virtual volume to the flash copy volume; and generating a second internal pointer for the set of data from the virtual volume to a bitmap for the storage volume.

16. The computer program product of claim 15, wherein the operations further comprise:

in response to the moving of the internal pointer, updating a bitmap for the LSA.

17. The computer program product of claim 15, wherein the operations further comprise:

determining a COW status on the storage volume targeted by the write request.

18. The computer program product of claim 15, wherein the operations further comprise:

detecting the virtual volume for the storage volume; and
detecting the flash copy volume for the storage volume.

19. The computer program product of claim 18, wherein the operations further comprise:

overwriting the set of data to the virtual volume, the set of data replacing a set of prior values within the virtual volume.

20. The computer program product of claim 19, the operations further comprising:

generating the second internal pointer for the set of data within the virtual volume to a location in a physical volume logical block address (LBA) map for the storage volume; and
based on moving the first internal pointer and generating the second internal pointer, triggering a bitmap update for the physical volume LBA map at the LSA.

* * * * *